United States Patent [19]
Ueda

[11] Patent Number: 5,327,258
[45] Date of Patent: Jul. 5, 1994

[54] IMAGE PROCESSING APPARATUS

[75] Inventor: Shigeru Ueda, Wako, Japan

[73] Assignee: Canon Kabushiki Kaisha, Tokyo, Japan

[21] Appl. No.: 786,602

[22] Filed: Nov. 1, 1991

[30] Foreign Application Priority Data
Nov. 1, 1990 [JP]  Japan .................. 2-293609

[51] Int. Cl.$^5$ .............................. G03F 3/08
[52] U.S. Cl. .................. 358/448; 358/445; 358/447; 358/458; 358/461; 358/521; 358/520
[58] Field of Search ............. 358/448, 451, 445, 447, 358/453, 401, 80, 456, 458, 461

[56] References Cited
U.S. PATENT DOCUMENTS

| | | | |
|---|---|---|---|
| 4,897,734 | 1/1990 | Sato et al. | 358/448 |
| 4,905,097 | 2/1990 | Wantanabe et al. | 358/448 |
| 5,101,282 | 3/1992 | Honma | 358/451 |
| 5,144,456 | 10/1992 | Sakano | 358/448 |

Primary Examiner—Edward L. Coles, Sr.
Assistant Examiner—Kimberly A. Williams
Attorney, Agent, or Firm—Fitzpatrick, Cella Harper & Scinto

[57] ABSTRACT

An image processing apparatus includes an input unit for inputting multivalue data for each pixel, a resolution conversion unit for generating multivalue data of one pixel corresponding to each block comprising one or a plurality of adjacent pixels of the input multivalue data in order to output multivalue data having a pixel density corresponding to a printing pixel density of a printing unit to the printing unit, and an assigning unit for assigning a magnification ratio of an output image. The resolution conversion unit changes the number of pixels of input image data constituting one block in accordance with the magnification ratio assigned by the assigning unit.

12 Claims, 8 Drawing Sheets

IMAGE PROCESSING APPARATUS

BACKGROUND OF THE INVENTION

1. Field of the Invention

This invention relates to a printing apparatus for printing characters formed by a host computer or the like, or an image read by a scanner, and more particularly, to an image processing apparatus which can be advantageously used when printing dot data by an electrophotographic method, such as a laser-beam printer or the like.

2. Description of the Related Art

When image data read by an image scanner (image reading device) or the like are printed by a laser-beam printer, the procedure of converting the image data into the pixel (picture element) density of the printing apparatus is shown in FIG. 8.

In FIG. 8, the data shown at the left are transmitted from a host computer or the like with a pixel density of 300 dpi (dots per inch), each square representing one pixel. A numeral (for example, 46) indicated in each square, or section, represents the density of that pixel. In the present case, pure black=the highest density is represented by 255, and pure white=the lowest density is represented by 0. A numeral representing a density will be hereinafter termed a gradation number.

The input data received from the scanner or the like via a host computer are first stored in an image memory within the printing apparatus. In order to convert the input data having the pixel density of 300 dpi into a printing pixel density of 150 dpi, pixel density conversion of 4:1 (area ratio) is first performed, as shown in the center of FIG. 8.

In FIG. 8, a numeral 48 indicated in section 211 is the average of the gradation numbers indicated in sections 201, 202, 203 and 204. Subsequently, when performing printing with magnification of 2, data after pixel density conversion are simply magnified by 2.

As described above, in the conventional apparatus, if the pixel density of input data is greater than the printing pixel density of the printing apparatus, the pixel density of input data is converted so as to coincide with the printing pixel density. When magnified printing is performed at the instruction of the operator, printing is performed using image data after the conversion of the pixel density. Hence, the conventional apparatus has the disadvantage that the picture quality of the magnified printed image is inferior to the picture quality of the input data.

In order to solve the above-described problem, a method of performing interpolation using a pixel having a density equal to the average of the densities of adjacent pixels when magnifying image data after resolution conversion may be considered, but deterioration in picture quality, such as undefined edge portions and the like, cannot be avoided.

SUMMARY OF THE INVENTION

It is an object of the present invention to solve the above-described technical problem.

It is a further object of the present invention to provide an image processing apparatus for adjusting the pixel density of input data in accordance with printing pixel density, capable of increasing picture quality in magnifying printing.

It is still further object of the present invention to provide an image processing apparatus which increases the efficiency of the use of memory.

It is still another object of the present invention to provide an image processing apparatus which can input multivalue data, convert the pixel density of the data, and change the magnification ratio of the converted data, and efficiently use a memory when performing image processing of the data, and in which deterioration of an image does not occur.

These and other objects are accomplished, according to one aspect of the present invention, by converting the pixel density of input image data by generating image data for one pixel corresponding to a plurality of adjacent pixels in the input image data, and variably setting the number of pixels in the input image data in accordance with a printing magnification ratio in the conversion of the pixel density. Accordingly, deterioration in picture quality caused by varying magnification processing performed after the pixel density conversion can be prevented.

According to another aspect of the present invention, only image data present in a printable region are extracted. Hence, memory can be efficiently used, and it is unnecessary to perform extraction processing of printing image data in a source generating the image data. For example, image data for one picture frame may be transmitted as they are.

The foregoing and other objects, advantages and effects of the present invention will become more apparent from the following detailed description of the preferred embodiments taken in connection with the accompanying drawings.

DETAILED DESCRIPTION OF THE PREFERRED EMBODIMENTS

The preferred embodiments of the present invention will now be explained in detail with reference to the drawings.

Figure 2:
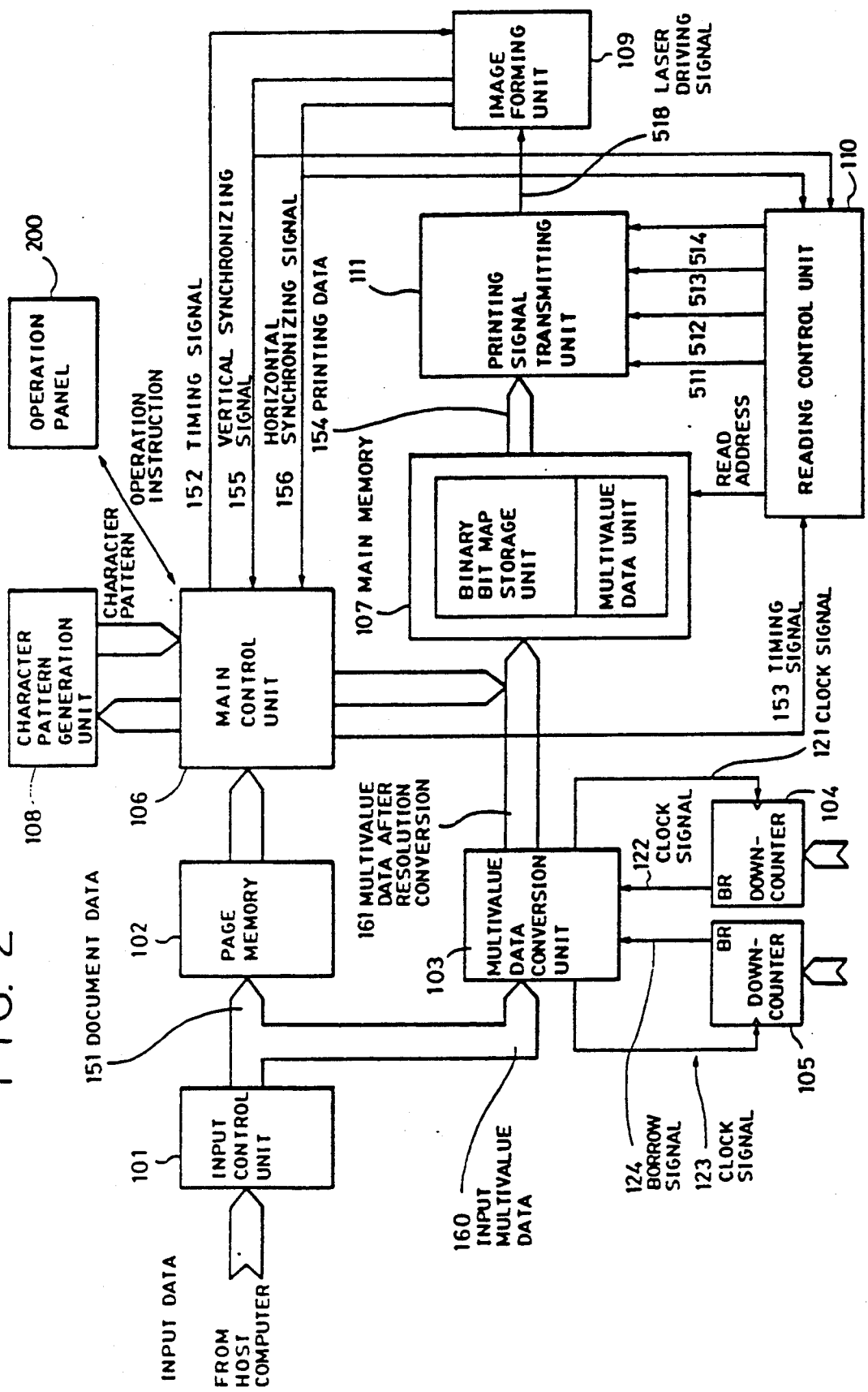
FIG. 2 is a block diagram showing the circuit configuration of a printing apparatus to which the present invention is applied.

Before explaining the present invention, an explanation will be provided of the circuit configuration of a control system for a printing apparatus to which the present invention is applied with reference to FIG. 2. In the present embodiment, code data (document data) representing characters to be printed in binary values, and multivalue image data read by a scanner or the like are output from a host computer.

In FIG. 2, an input control unit 101 is also termed an interface, and inputs various kinds of information to be exchanged with the host computer, that is, document data 151 to be printed and input multivalue data 160.

A page memory 102 stores the above-described document data 151. A multivalue data conversion unit 103 converts the resolution of multivalue data according to the present invention.

Down-counters 104 and 105 generate clock signals 122 and borrow signal 124 for assigning the position of the multivalue data, serving as an object of conversion. Before the input of the multivalue data, a value indicating the size of an image region, serving as an object of printing, is set by a main control unit 106.

Figure 6:
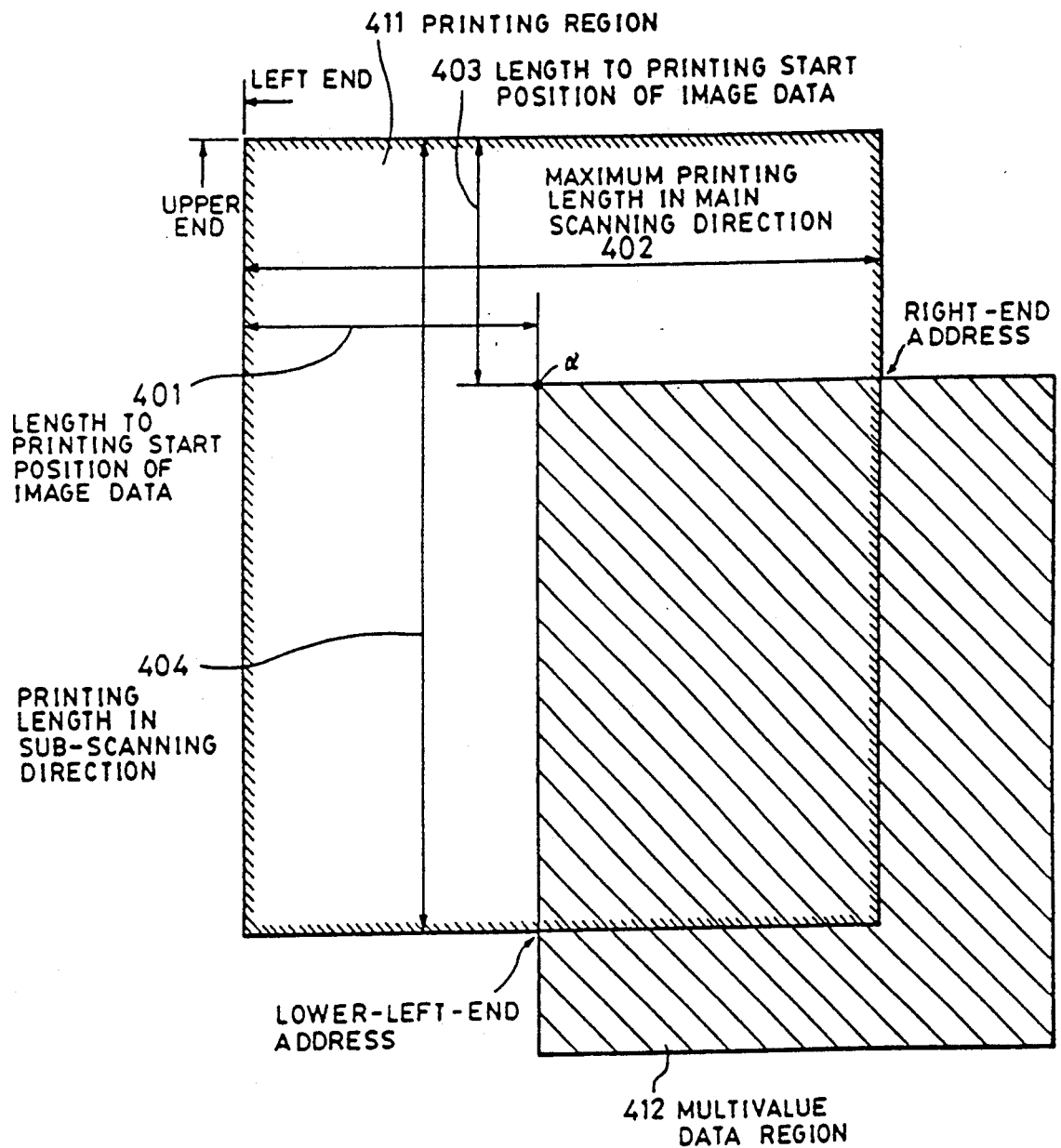
FIG. 6 is a diagram illustrating a printing region for image data in the embodiment of FIG. 1.

In FIG. 6, reference numeral 411 represents a printing region, and reference numeral 412 represents a region where multivalue data converted by the multivalue data conversion unit 103 are to be printed. Actually, printing is not performed on regions where the region 411 and the region 412 do not overlap, and hence data on these regions may be abandoned.

Figure 4:
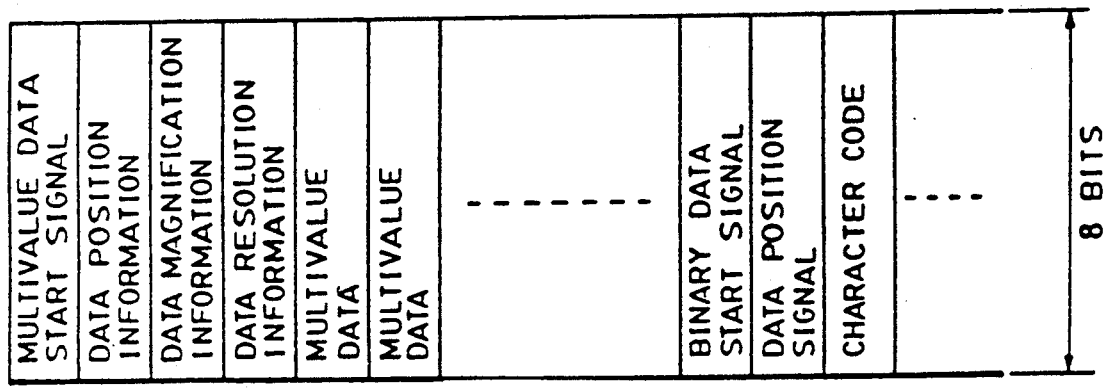
FIG. 4 is a diagram illustrating the contents of document data according to the embodiment of FIG. 1.

The printing region 411 is determined by the size of printing paper, and the multivalue data region 412 is determined by its upper left point (determined by data position information relating to multivalue data shown in FIG. 4) and the amount of multivalue data.

In modification of the present embodiment, when a character region (binary region) and a multivalue image region can be set, printing may be performed on a desired region (a region overlapping with the printing region) of the multivalue data region 412 by making the multivalue image region the printing region 411, and for example, assigning the upper left point of the multivalue data region 412.

A value obtained by subtracting a length 401 from a length 402 in the horizontal direction is set in the down-counter 104. A value obtained by subtracting a length 403 from a length 404 in the vertical direction is set in the down-counter 105.

If it is assumed, for example, that the length 401=4 inches, the length 402=8 inches, the length 403=10 inches, and the length 404=17 inches the length of the image region in the horizontal direction=4 inches, and the length of the image region in the sub-scanning direction=7 inches.

Since the printing apparatus in the present embodiment prints data of 150 dots per inch, numerical values 4×150=600 and 7×150=1050 are set in the down counters 104 and 105, respectively.

The value of the counter 104 is reduced by one by a clock signal 121 every time data in the horizontal direction is sent to a main memory 107. When the value in the down counter 104 becomes "0", a count-up signal is output to the multivalue data conversion unit 103 as a clock signal 122. In receiving the signal 122, the multivalue data conversion unit 103 outputs a clock signal 123 to reduce the value of the counter 105 by one, and ignores subsequently input data in the horizontal direction.

Before data of the next line are input, data before the counting operation are reloaded in the counter 104 by the main control unit 106. Subsequently, data of the next line are input, and the same operation is repeated. When the value of the down counter 105 becomes "0", the down counter 105 outputs a borrow signal 124. In receiving the signal 124, the multivalue data conversion unit 103 ignores subsequently input multivalue data within the same page.

The main control unit 106 executes the control of the operation of the entire apparatus, and comprises a microcomputer or the like.

A character pattern generation unit 108 converts document data in the form of character codes into an image pattern in the form of dots.

The main memory 107 stores the document data converted into the image pattern as printing data.

The document data stored in the main memory 107 are read by a printing signal transmitting unit 111 by the instruction of reading control unit 110, and are transferred to an image forming unit 109.

The image forming unit 109 generates a laser beam in accordance with a laser driving signal 518, forms an image on a photosensitive member, and then prints on recording paper.

Figure 1:
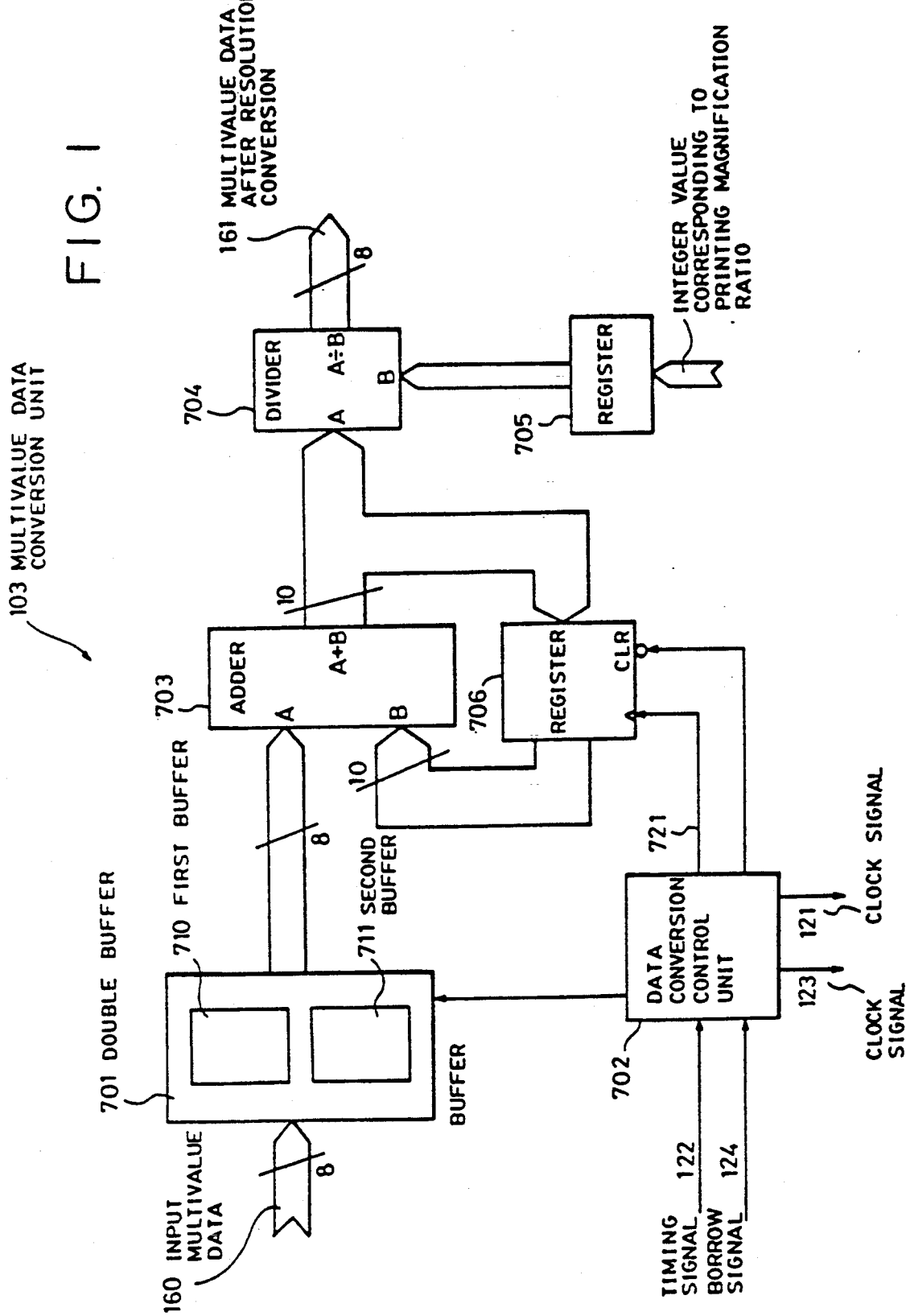
FIG. 1 is a block diagram showing the circuit configuration of a multivalue data conversion unit 103 according to an embodiment of the present invention.

FIG. 1 shows the circuit configuration of the multivalue data conversion unit 103.

In FIG. 1, a double buffer 701 comprises buffers 710 and 711, and stores multivalue data 160 (to be described later) for two lines.

While one of the buffers 710 and 711 stores the multivalue data 160, data stored in the other buffer are read by a data conversion control unit 702 and are transmitted to an adder 703.

A register 706 stores the result of addition by the adder 703, and reinputs the result to the adder 703 as calculation data for addition processing.

Data of 300 dpi are input to a register 705, which outputs the data to the image forming unit of 150 dpi. When the magnification ratio is "1" a constant "4" is preset in the register 705, which provides a divider 704 with data for division. The divider 704 performs division processing on the result of addition by the adder 703, that is, processing of averaging the multivalue data.

Figure 3:
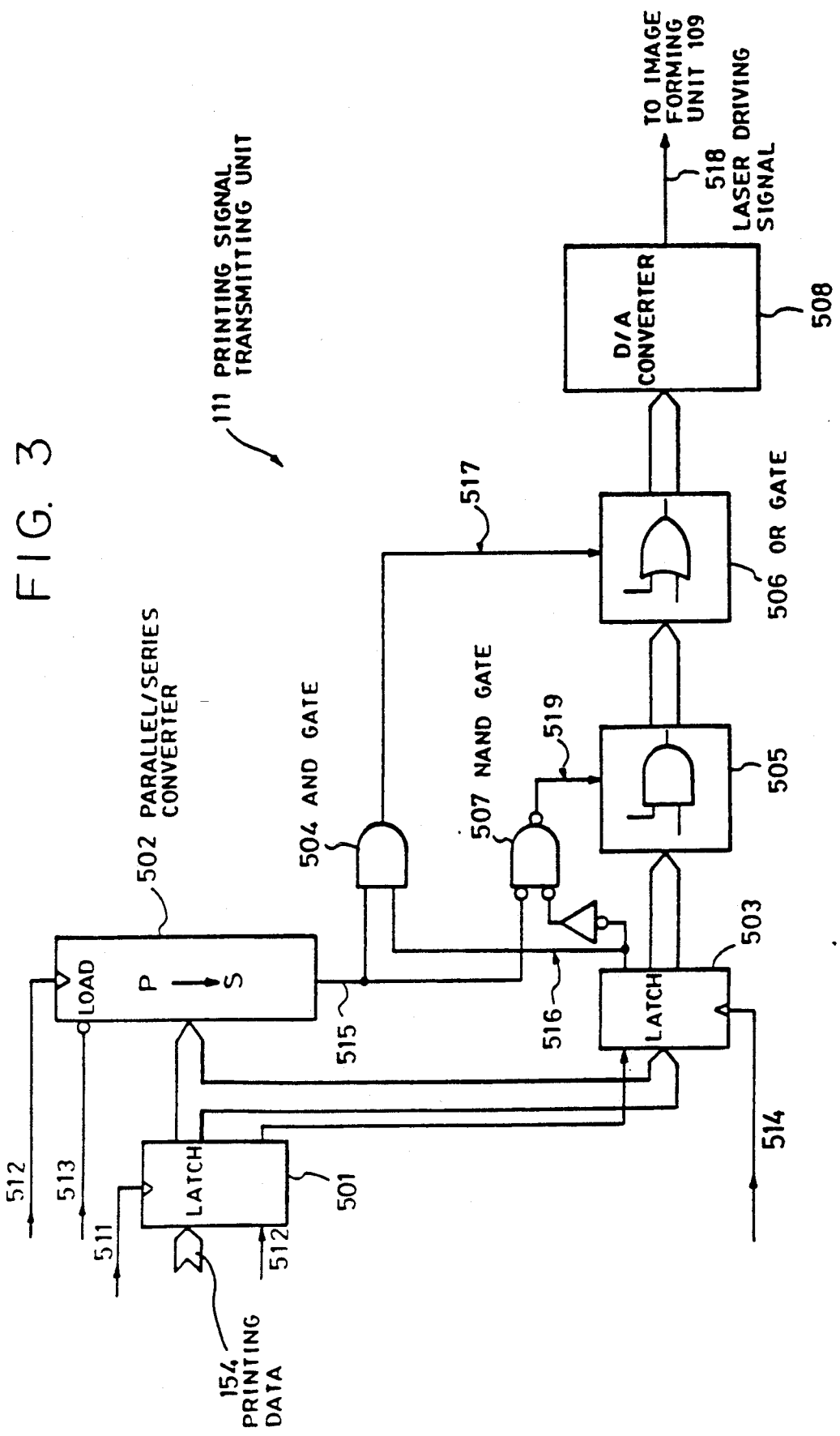
FIG. 3 is a block diagram showing the circuit configuration of the printing signal transmitting unit 111 shown in FIG. 2.

FIG. 3 shows the circuit configuration of the printing signal transmitting unit 111 shown in FIG. 2.

In FIG. 3, a latch 501 latches a signal 512 output from the reading control circuit 110 and printing data 154 output from the main memory 107 by a timing signal 511 of the reading control circuit 110. The shift clock signal 512 becomes "LOW" level when data from the main memory comprise binary data, and becomes "HIGH" level when the data comprise multivalue data. The printing data latched in the latch 501 are further loaded in a latch 503 and a parallel/series converter 502.

When it is indicated that the printing data comprise binary data, the printing data loaded in the parallel/series converter 502 are sequentially output as printing signal 515 by the shift clock signal 512 of the reading control unit 110.

A signal 516 latched in the latch 503 by a signal 514 assumes "HIGH" level indicating binary data. Hence, when the printing signal 515 converted into a signal by the parallel/series converter 502 assumes "HIGH" level indicating black, an AND gate 504 opens. As a result, input 517 to an OR gate 506 becomes "HIGH" level, and all the output from the OR gate 506 becomes "HIGH" level. Hence, the output of a D/A converter 508 becomes the highest level, and a laser driving signal indicating black in binary notation is output to the image forming unit 109.

On the other hand, when the printing signal 515 converted into a series signal by the parallel/series converter 502 assumes "LOW" level indicating white, a NAND gate 507 opens, and its output becomes "LOW"

level. Hence, all the output of the OR gate 506 becomes "LOW" level, whereby the output of the D/A converter 508 becomes the lowest level, and a laser driving signal indicating white in binary notation is output to the image forming unit 109.

When the printing data comprise multivalue data, the printing data 154 latched in the latch 503 represent the density of one dot using the entire data, unlike in the case of binary data. For example, when the data comprise 8 bits, "00" in hexadecimal notation represents density 0 (that is, the same as white in binary notation), and "FF" in hexadecimal notation represents the highest density (that is, the same as black in binary notation).

After all, the output of the latch 503 is transmitted to the D/A converter 508 without being modified, and therefore the output, that output being laser driving signal 518, of the D/A converter 508 assumes a voltage level corresponding to the output value of the latch 503.

The amount of output light of the laser changes in accordance with the voltage level of the laser driving signal 518, whereby multi-gradation printing is performed.

Data to be subsequently printed are transmitted from the reading control unit 110 to the latch 501.

By repeating the above-described operation for the amount of one page, the laser driving signal 518 is generated in accordance with the binary and multivalue data.

Attention must be paid to the following fact. In the case of binary data, when transmitted data comprise 8 bits, since each of 8 bits represents printing data, 8 printing data are transmitted in one operation. In the case of multivalue data, however, since the transmitted 8 bits represent the density of one dot, data whose amount is 8 times the amount of binary data must be transmitted.

An explanation will now be provided of the operation of the circuitry shown in FIG. 2 having the above-described configuration.

In the present embodiment, multivalue data indicating the number of gradation of image data and binary data relating to character data and the printing control code are transmitted from the host computer in a communication format as shown in FIG. 4.

In FIG. 4, multivalue data contain information of density=gradation having $2^8=256$ steps, and comprise 8 bits per pixel. The position to start printing of the multivalue data on printing paper is indicated by data position information, and printing magnification ratio is indicated by data magnification information.

Also for character data, data position information indicating the printing position and, if necessary, magnification information relating to magnification ratio are transmitted together with a character code.

Once such document data 151 are input to the input control unit 101, binary data are first stored in the page memory 102. Multivalue data indicating image data are first transmitted to the multivalue data conversion unit 103.

The multivalue data conversion unit 103 performs conversion of multivalue data to adjust the data to the resolution of the printing apparatus according to the resolution of transmitted multivalue data, information on the assignment of magnification/reduction ratio of the multivalue data, and information of printing density of the printing unit of the image forming unit 109.

Figure 8:
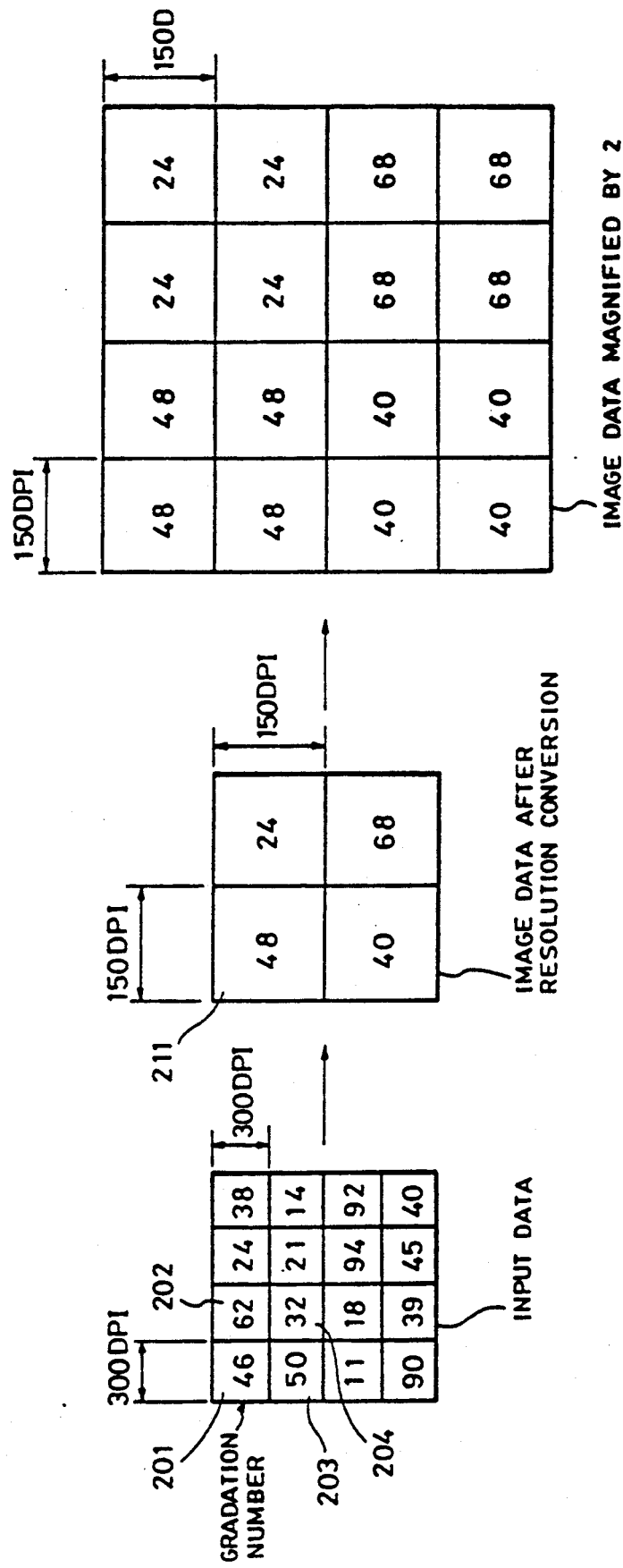
FIG. 8 is a diagram illustrating a conventional example of resolution conversion.

For example, if the resolution of transmitted multivalue data is 300 dpi as shown in FIG. 8, the magnification ratio=unit magnification, and the printing density of the printing unit is 150 dpi, printing can be performed in the same size by converting 4 input data, that is, 2 in the vertical direction by 2 in the horizontal direction, into one datum.

For that purpose, the data conversion control unit 702 shown in FIG. 1 first reads datum "46" in section 201 in FIG. 8 from among multivalue data stored in the double buffer 701. This datum is first added to the initial value "0" of the register 706 by the adder 703. As a result, the datum "46" is latched in the register 706.

Subsequently, by the instruction of the data conversion control unit 702, datum "62" in section 202 in FIG. 8 is read, and the output $46+62=108$ of the adder 703 is latched in the register 706. Subsequently, the data in sections 203 and 204 are sequentially read, and the output of the adder 703 finally becomes $46+62+50+32=190$.

Figure 5:
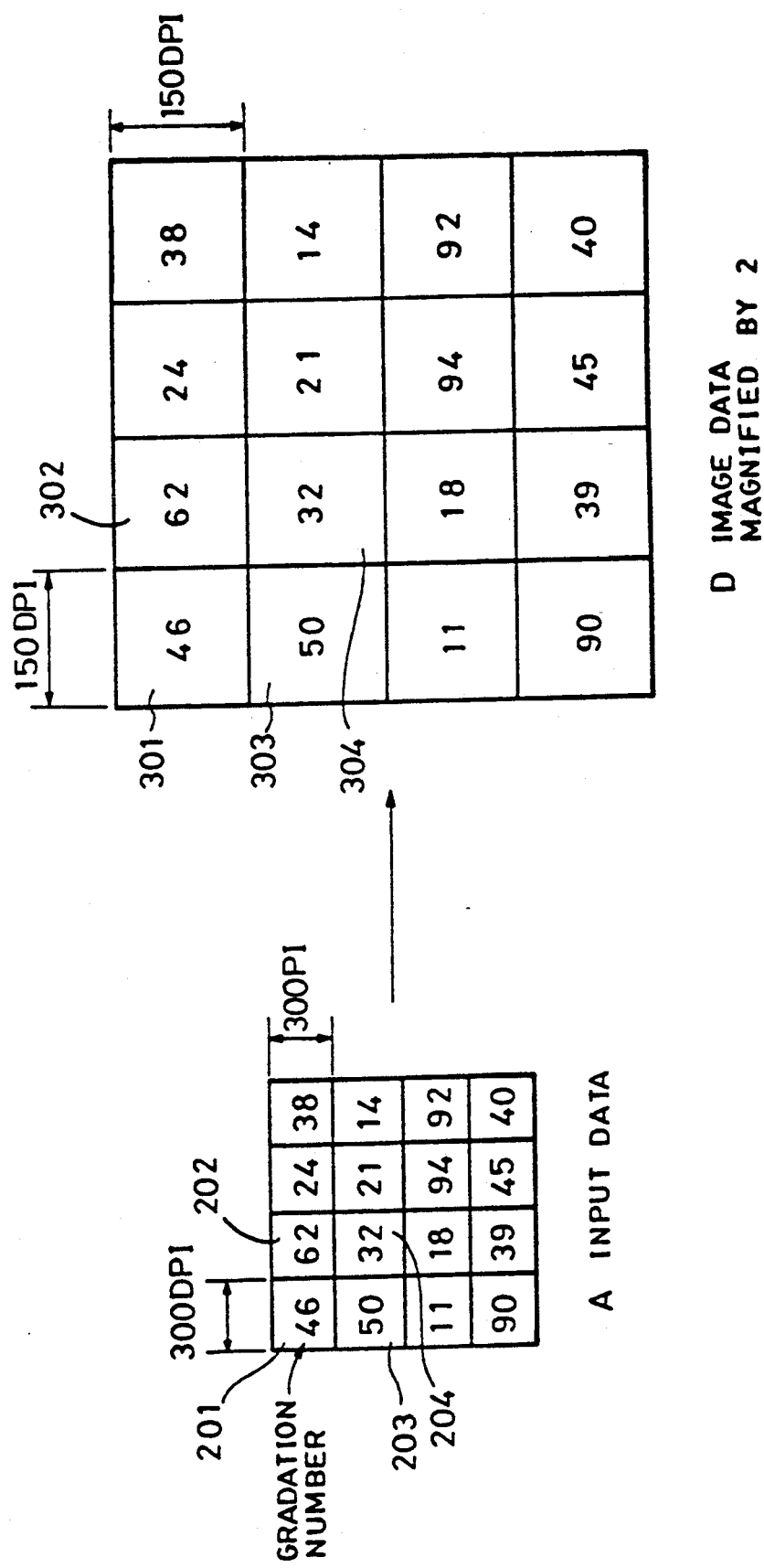
FIG. 5 is a diagram illustrating an example of resolution conversion in the embodiment of FIG. 1.

When the printing magnification ratio indicated by magnification information is "1", "4" is preset in the register 705 by the instruction of the main control unit 106. Accordingly, in FIG. 2 the datum 161 becomes $190 \div 4 = 47.5 \rightarrow 48$. When the printing magnification ratio is 2, data read from the double buffer 701 are transmitted to a divider 704 as they are. Since "1" is preset in the register 705 by the instruction of the main control unit 106, input multivalue data are output as they are in the present embodiment (see FIG. 5).

More generically, the square of a value obtained by dividing the ratio of the pixel density of input data to the pixel density of output data by the printing magnification ratio is set in the register 705 (accordingly, data of pixels whose number is set are added together in the adder 703).

In receiving the timing signal, (clock signal) 122, the multivalue data conversion unit 103 stops reading of data from its buffer, and shifts to the next processing by inverting the buffer as soon as the input of the data 160 to the other buffer is completed. In receiving the borrow signal 124, the data conversion control unit 702 stops reading of data from the double buffer 701, and performs no processing until the next page.

The binary data first loaded in the page memory 102 are converted into dot data by the main control unit 106 while sequentially referring to the character pattern generation unit 108, and are stored in a binary bit map storage unit of the main memory 107.

When data for one page have been stored in the main memory 107, the main control unit 106 transmits a timing signal (printing start signal) 152 to the image forming unit 109, and also transmits a timing signal (reading start command) 153 to the reading control unit 110.

The reading control unit 110 reads first printing data from the main memory 107, and loads the read data in the latch 501 within the printing signal transmitting unit 111. At that time the signal 512 indicating whether the data read from the main memory 107 are binary data or multivalue data is also latched.

According to the signal 512, the printing signal transmitting unit 111 performs the above-described signal processing, and generates a laser driving signal 518 having a constant voltage level for binary data. The printing signal transmitting unit 111 generates a laser driving signal having variable voltage levels for multivalue data. In place of the D/A converter 508, circuitry for outputting a laser driving signal subjected to pulse-width modulation in accordance with input 8-bit data may be provided.

The image forming unit 109 generates a laser beam according to the laser driving signal 518, and outputs a vertical synchronizing signal 155 and a horizontal synchronizing signal 156 for notifying a printing position timing in receiving a signal 152.

In receiving the vertical synchronizing signal 155 and the horizontal synchronizing signal 156, the reading control unit 110 calculates a printing start timing, and starts to transmit the laser driving signal 518 to the image forming unit 109 when the laser beam reaches the printing start position, that is, the printing region.

Every time the document data 151 is received, the main control unit 106 calculates a value to be set in the register 705 of the multivalue data conversion unit 103 using a predetermined conversion formula or conversion table according to printing magnification information of multivalue data. As a result, even when the conversion of resolution is performed with adjustment of the input data shown in FIG. 8 with the recording pixel density of the printing apparatus, multivalue image data for twofold magnification are directly formed from the input data. Hence, as is apparent by comparing the conventional multivalue image data after twofold magnification shown in FIG. 8 with data in the present embodiment shown in FIG. 5, in the present embodiment, multivalue image data after resolution conversion have the same gradation representation as that of input data (that is, deterioration in picture quality is not present).

Figure 7:
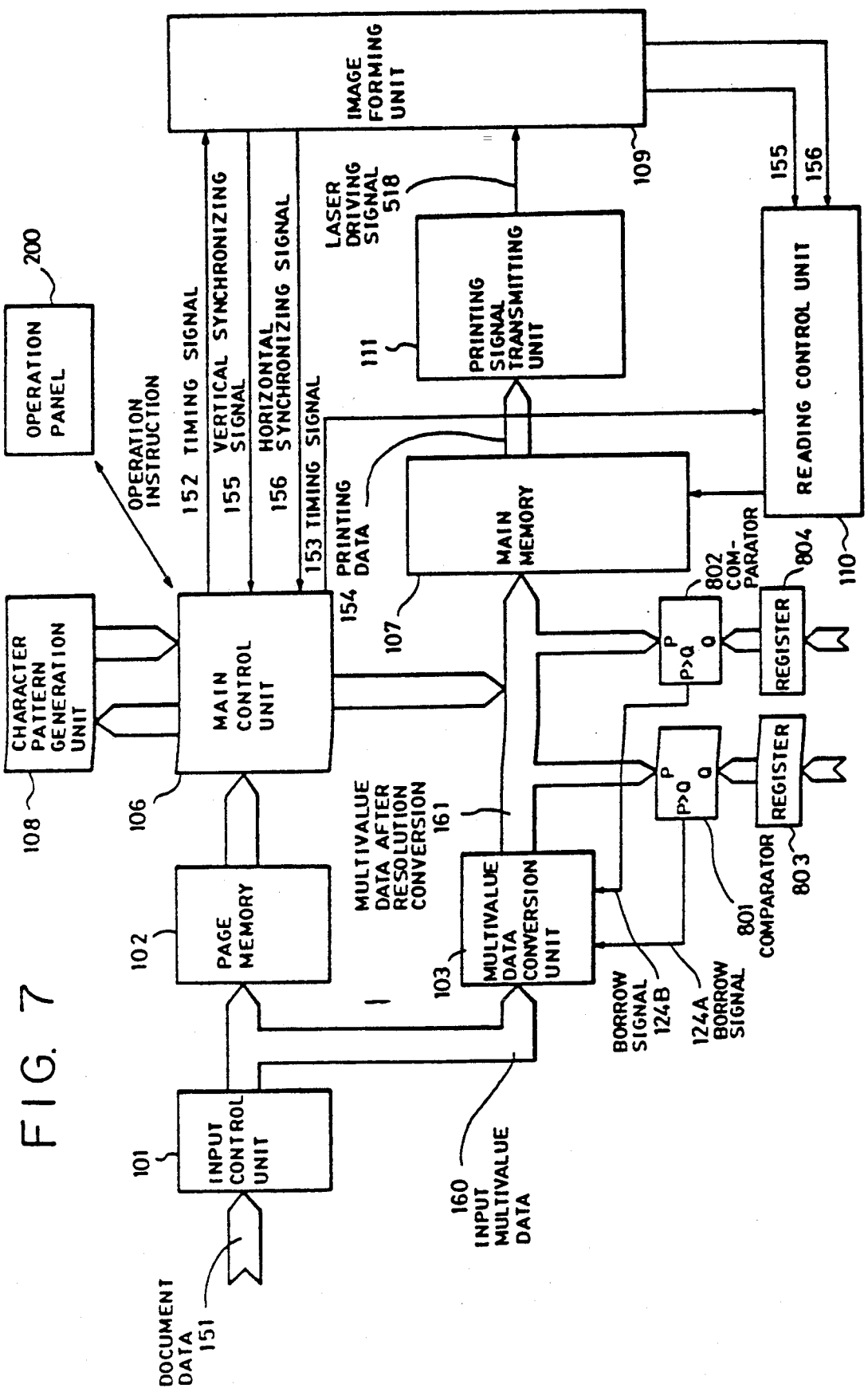
FIG. 7 is a block diagram showing the circuit configuration of a printing apparatus according to another embodiment of the present invention.

FIG. 7 shows the configuration of circuitry according to another embodiment of the present invention.

In FIG. 7, the same constituents as those in the FIG. 2 embodiment are indicated by the same reference numerals. In FIG. 7, there are shown comparators 801 and 802, and registers 803 and 804.

The address (see FIG. 6) of the lower left end of the printable region for image data stored in the main memory 107 is preset in the register 803 by the main control unit 106.

A common portion in lower-side right-end addresses of the printable region in the image memory is set in the register 804.

For example, if the right-end address of the first line is "01F00", the right-end address of the second line is "02F00", and the right-end address of the third line is "03F00", "F00" is set in the register 804. The comparators 801 and 802 compare information of address portions in multivalue data 161 after resolution conversion with values stored in the registers 803 and 804, respectively.

If the address of multivalue image data exceeds the printable region, the comparators 801 and 802 output borrow signals 124A and 124B, respectively, to notify invalidity of multivalue image data. Hence, the transfer of image data outside the printable region does not occur.

Although, in the above-described embodiment, the magnification ratio is assigned according to data from the host computer, the ratio may be assigned using an operation panel 200.

As explained above, according to the present invention, even if the printing pixel density of an output apparatus is lower than the pixel density of input image data, image data having equivalent picture quality can be obtained by performing magnified printing. The invention also has the advantage that a memory having an unnecessarily large capacity for separately inputting image data for magnification is not needed.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image processing apparatus comprising:
    input means for inputting first multivalue data for each pixel, said input means being capable of inputting the first multivalue data having a resolution different from a printing resolution of a printing unit;
    resolution conversion means for generating second multivalue data, one pixel of the second multivalue data corresponding to one block of the first multivalue data so as to output to the printing unit the second multivalue data having a resolution corresponding to the printing resolution; and
    assigning means for assigning a magnification ratio of an output image,
    wherein said resolution conversion means determines a number of pixels of the first multivalue data corresponding to one block in accordance with the magnification ratio assigned by said assigning means.

2. An image processing apparatus according to claim 1, wherein said resolution conversion means calculates the average value of first multivalue data of one or a plurality of pixels corresponding to one block as the second multivalue data for one pixel.

3. An image processing apparatus according to claim 1, wherein said resolution conversion means comprises means for extracting the first multivalue data corresponding to a printing region in the printing unit, and performs resolution conversion processing on the extracted first multivalue data.

4. An image processing apparatus according to claim 1, wherein said printing unit performs printing using a laser beam.

5. An image processing apparatus according to claim 4, further comprising means for outputting a laser driving signal having a voltage level corresponding to the second multivalue data output from said resolution conversion means.

6. An image processing apparatus according to claim 4, further comprising means for outputting a PWM (pulse-width modulation) signal having a pulse width in accordance with the second multivalue data output from said resolution conversion means.

7. An image processing apparatus according to claim 1, further comprising means for inputting code data representing a character to be printed as a binary image.

8. An image processing apparatus according to claim 7, further comprising means for generating a character pattern corresponding to the input code data.

9. An image processing apparatus according to claim 8, further comprising means for storing binary data including the character pattern.

10. An image processing apparatus according to claim 9, further comprising means for selecting between the second multivalue data and the binary data for outputting to the printing unit.

11. An image processing method comprising the steps of:

inputting first multivalue data for each pixel, the first multivalue data having a resolution different from a printing resolution of a printing unit;

generating second multivalue data, one pixel of the second multivalue data corresponding to one block of the first multivalue data so as to output to the printing unit the second multivalue data having a resolution corresponding to the printing resolution; and assigning a magnification ratio of an output image, wherein, in said generating step, a determination is made as to a number of pixels of the first multivalue data corresponding to one block, in accordance with the magnification ratio assigned in said assigning step.

12. An image processing method according to claim 11, wherein, in said generating step, the first multivalue data corresponding to a printing region in the printing unit is extracted, and resolution conversion processing is performed on the extracted first multivalue data.

* * * * *

UNITED STATES PATENT AND TRADEMARK OFFICE
CERTIFICATE OF CORRECTION

PATENT NO. : 5,327,258
DATED : July 5, 1994
INVENTOR(S) : SHIGERU UEDA

It is certified that error appears in the above-identified patent and that said Letters Patent is hereby corrected as shown below:

ON TITLE PAGE

In [56] References Cited, under U.S. PATENT DOCUMENTS,
insert: --4,891,634  1/1990  Ina et al. .... 340/723--.

In [56] References Cited, after U.S. PATENT DOCUMENTS,
insert: --     FOREIGN PATENT DOCUMENTS
       3-16757  1/1991  Japan ..... B41J/485--.

In [56] References Cited, under Attorney, Agent, or Firm:
"Fitzpatrick, Cella Harper & Scinto" should read
--Fitzpatrick, Cella, Harper & Scinto--.

COLUMN 3

Line 11, "signals" should read --signal--.

COLUMN 4

Line 33, ""1"" should read --"1",--.

COLUMN 5

Line 14, "After all, the" should read --The--.
Line 16, "output, that" should read --output of the D/A converter 508, that--.
Line 17, "of the D/A converter 508" should be deleted.
Line 40, "gradation" should read --gradations--.

UNITED STATES PATENT AND TRADEMARK OFFICE
CERTIFICATE OF CORRECTION

PATENT NO. : 5,327,258
DATED : July 5, 1994
INVENTOR(S) : SHIGERU UEDA

It is certified that error appears in the above-identified patent and that said Letters Patent is hereby corrected as shown below:

COLUMN 6

Line 34, "signal," should read --signal--.

Signed and Sealed this

Eighteenth Day of October, 1994

Attest:

BRUCE LEHMAN

*Attesting Officer*  *Commissioner of Patents and Trademarks*